Aug. 28, 1945.   D F. McCLELLAN ET AL   2,383,557
TEST METER FOR MAGNETOS
Filed Aug. 24, 1943
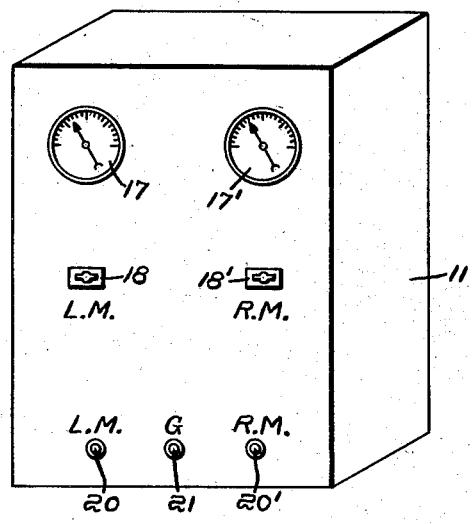
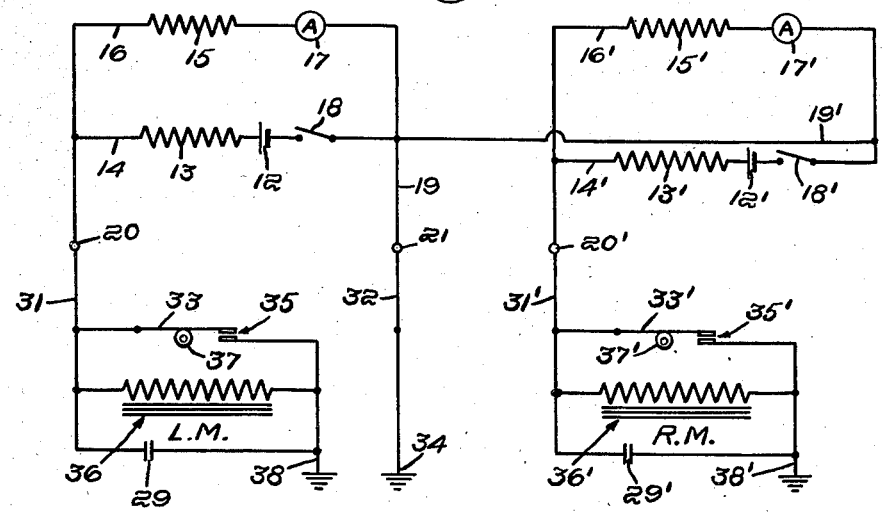
Inventor:
Donald F. McClellan,
Henry Chasen,
by Thomson & Thomson
Attorneys Patented Aug. 28, 1945

2,383,557

UNITED STATES PATENT OFFICE 2,383,557

TEST METER FOR MAGNETOS

Donald F. McClellan and Henry Chasen,
Boston, Mass.

Application August 24, 1943, Serial No. 499,764

1 Claim. (Cl. 177—311)

This invention relates to improvements in test meters used in adjusting the magnetos of aircraft, marine, motor vehicle and other internal combustion engines which are equipped with magnetos for controlling the timing of the engine.

The principal purpose of the invention is to provide a simple, economical and efficient test meter which will easily and accurately indicate the exact instant that the breaker points of the magnetos open and close, and which may be easily connected for testing without disturbing the electrical circuit of the magneto.

One object of the invention is to provide a testing device which may be housed in a small, compact and easily transportable container, which may be quickly attached to the magneto by ordinary lead wires, and which may be so connected that the timing of the engine may be tested and regulated while its ignition switch is in "off" position.

A further object is to provide a test meter which whill simultaneously indicate the timing relationship of both of a pair of magnetos with which aircraft engines are normally equipped, whereby the two magnetos may be accurately synchronized or adjusted for staggered operation, as required.

A recommended embodiment of our invention is shown in the accompanying drawing of a test meter adapted for testing a pair of magnetos, but it will be understood that the structural and electrical details of the apparatus herein illustrated and described may be varied to suit particular conditions without departing from the essence of this invention as defined in the appended claim. In the drawing, Fig. 1 is a perspective view of the meter case, showing the dual meters, the switches of the respective meter circuits, and the jacks or terminals to which the leads to the magnetos are connected; and Fig. 2 is a circuit diagram showing the relative arrangement of the electrical elements of the dual circuits when the testing device is connected to a pair of magnetos.

For dual operation, the meter case 11 contains a pair of batteries, indicated at 12 and 12' in Fig. 2, which may be standard 1.5 volt dry cells of flashlight size; 6 ohm resistors, indicated at 13 and 13' in Fig. 2, in the battery leads 14 and 14' respectively, and 5 ohm resistors 15 and 15' in the ammeter leads 16 and 16'; milliammeters or other indicators 17 and 17'; manual switches 18 and 18' in the battery-ground leads 19 and 19'; jacks or terminals 20 and 20' for connecting the lead wires to the primaries of the respective magnetos, and jack 21 for a common lead wire to ground. The face of the meter case may be marked with the letter "G" to indicate the ground terminal and the letters "LM" and "RM" to designate the switches and jacks for the left and right magnetos, respectively; and it will be evident that the meter may be used for testing one magneto at a time by using either of the two complemental switches and jacks and the ground terminal 21 which is common to the two circuits.

It will be observed that the respective ammeters and batteries are arranged in parallel with their external circuits, and it will be appreciated that the switches 18 and 18' should be left open until the lead wires from the meter box are connected to the magnetos. Otherwise, the meter needles will fluctuate when the switches are closed.

The lead wires to the respective magnetos are indicated at 31 and 31' in Fig. 2, and the common ground lead is indicated at 32. These leads may be equipped with plugs at one end, fitting jacks of the meter case, and their opposite ends may have spring clips for quick attachments of wires 31 and 31' to the breaker arms 33 and 33' and of wire 32 to a ground 34 at any metal part of the engine. The lead wires 31 and 31' are preferably colored differently from ground lead 32.

The respective magnetos are represented by the said breaker arms 33 and 33', the points 35 and 35', the coil primaries 36 and 36', and the condensers 29 and 29' which are common to all such magnetos. It will be understood that the breaker arms are actuated by the cams 37 and 37', and that the parallel circuits through the breaker points and through the primary are grounded to the engine as indicated at 38 and 38'.

Thus, when the lead wires 31, 31' and 32 are connected as described, and when the switches 18 and 18' are then closed, the battery current of the respective meter circuits may flow to ground through any one or more of four parallel paths, three of which are closed and the fourth of which (the breaker points) may be intermittently opened and closed for testing by hand operation of the engine, preferably while the ignition switch is closed.

The circuit through the breaker points offers the line of least resistance when the points are closed. Hence, in that condition, but very little current will flow through the meters and the needle will show a very low reading; whereas, at the moment the breaker points open, substantially more current flows through the meters and immediately registers by a jump of the needle to a high reading. This visual indication ensures that the engine may be accurately timed by adjusting the respective magnetos so that they are synchronized or staggered in operation, as desired. Furthermore, the value of the low reading of the meters tends to indicate the condition of the breaker points, for if the reading is higher than normal less current is flowing through the points because they have become pitted or dirty. It will also be evident that the improved test meter wil indicate the internal condition of the magneto, for if its primary is open, the indicator will immediately show an abnormally high reading while the breaker points are open.

It will be understood, as aforesaid, that either test meter of the device herein disclosed may be used separately, and that a test meter involving a single circuit for timing a single magneto may be constructed and used in the same fashion as above explained without departing from our invention. It will also be appreciated that other types of electrical indicators, such as bells, buzzers or lights, may be utilized in place of the ammeters 17 or 17' to notify the observer the moment the breaker points open. It is recommended, however, that any such indicator or signal be actuated by a small current; for best results are obtained when a very small current is used to operate the test meter.

We claim:

A test meter of the character described comprising a portable container housing test circuits for simultaneously indicating the times at which the breaker points of a pair of magnetos are respectively opened, each circuit including a 1.5 volt dry battery, a resistor for maintaining low capacity in said circuit, an indicator sensitive to weak direct current, and a switch for closing each circuit independently of the other, the respective circuits being connectable in parallel to each of a pair of magnetos having a grounded, uninterrupted primary and grounded breaker points, the container having a common terminal for a wire leading from the batteries of both test circuits to ground and separate terminals for wires leading from a point in the respective test circuits between the resistor and the indicator thereof to the breaker arms of the respective magnetos, so that, when said wires are connected and the switches are closed, each indicator shows a minimum indication while the breaker points of the tested magneto are closed, a maximum indication immediately upon the opening of said points, and an intermediate indication if the closed points are pitted or dirty.

DONALD F. McCLELLAN.
HENRY CHASEN.